US006693649B1

(12) United States Patent
Lipscomb et al.

(10) Patent No.: US 6,693,649 B1
(45) Date of Patent: Feb. 17, 2004

(54) SYSTEM AND METHOD FOR UNIFYING HOTSPOTS SUBJECT TO NON-LINEAR TRANSFORMATION AND INTERPOLATION IN HETEROGENEOUS MEDIA REPRESENTATIONS

(75) Inventors: James S. Lipscomb, Yorktown Heights, NY (US); Sih-Pin Subrina Chang, Old Tappan, NJ (US); Shu-Chun Jeane Chen, Chappaqua, NY (US); Keeranoor G. Kumar, Randolph, NJ (US); Jai Menon, Alpharetta, GA (US); Arun Ramchandra, Danbury, CT (US); Edward C. Snible, New York, NY (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,875

(22) Filed: May 12, 2000

Related U.S. Application Data

(60) Provisional application No. 60/136,390, filed on May 27, 1999.

(51) Int. Cl.7 .................................................. G06F 3/14
(52) U.S. Cl. ...................................... 345/762; 345/803
(58) Field of Search .............................. 345/762, 803, 345/853, 708, 854, 978

(56) References Cited

U.S. PATENT DOCUMENTS 5,737,619 A    4/1998   Judson (List continued on next page.)

OTHER PUBLICATIONS

U.S. patent application Ser. No. 08/447,585, Chang et al., filed Nov. 23, 1999. A System and Method for Adaptive Delivery of Rich Media Content to a User in a Network Based on Real Time Bandwidth Measurement & Prediction According to Available User Bandwidth.

(List continued on next page.)

*Primary Examiner*—Cao Nguyen
(74) *Attorney, Agent, or Firm*—David M. Shofi

(57) ABSTRACT

A system and method for unifying hotspot subject to non-linear transformation and interpolation in heterogeneous media representations includes a content creator for creating Rich Media, e.g. stills, animation, panorama and a delivery system including an action handler for responding to a hotspot in the Rich Media when selected by a user interacting with a projected image display. The hotspot is expressed in the media as an area defined in terms of a Euclidean, rectangular coordinate system for transformation and mapping of the media image hotspot coordinates into corresponding coordinates of a hotspot location in the projected image display. Unfortunately, the image coordinates in the media do not necessarily map directly into corresponding coordinates in the projected image. Flat media images can be linearly transformed to projected image coordinates. However, panorama media require non-linear transformation of media coordinated to projected image coordinates. The coordinates for the media hotspot are stored in a centralized action handler independent of the non-linearities in the media. As a result of a user selecting or picking a hotspot in the projected image, the pick may fall outside of the corresponding hotspot in the case of non-linear media. The hotspot in the media and the projected image may be unified by increasing the number of points in the area geometry which makes more reliable that a pick in the projected image hotspot will fall within the hotspot area in the media. When the projected image hotspot is picked by a mouse or other input device, a signal is transmitted to the media indicating the coordinates of the input device with respect to the media. The media transforms the input coordinates and queries the action handler for a stored hotspot at the location of the input device. The action handler returns the hotspot, if any at the queried location The media displays the hotspot, if any at the location and the input device location on the media. When the pick falls within the media hotspot area and is actuated, the action handler initiates events associated with the picked hotspot in the projected image.

29 Claims, 12 Drawing Sheets

U.S. PATENT DOCUMENTS

| | | | |
|---|---|---|---|
| 5,794,257 A | * | 8/1998 | Liu et al. .................... 345/762 |
| 5,841,978 A | | 11/1998 | Rhoads |
| 5,912,670 A | | 6/1999 | Lipscomb et al. |
| 5,918,012 A | | 6/1999 | Astiz et al. |
| 5,926,179 A | * | 7/1999 | Matsuda et al. ............ 345/803 |
| 5,966,121 A | * | 10/1999 | Hubbell et al. ............. 345/853 |
| 6,031,541 A | | 2/2000 | Lipscomb et al. |
| 6,230,162 B1 | | 5/2001 | Kumar et al. |
| 6,230,167 B1 | | 5/2001 | Lipscomb et al. |
| 6,356,921 B1 | | 3/2002 | Kumar et al. |
| 6,388,688 B1 | * | 5/2002 | Schileru-Key ............. 345/762 |
| 6,448,980 B1 | | 9/2002 | Kumar et al. |

OTHER PUBLICATIONS

U.S. patent application Ser. No. 09/438,493, Chang et al., filed Nov. 12, 1999. "A System and Method of Enriching Non–Linkable Medis Representations in a Network by Enabling an Overlying Hotlink Canvas."

U.S. patent application Ser. No. 09/376,102, Hurtado et al., filed Aug. 17, 1999. "Secure Electronic Content Distribution on CDS and DVDS."

* cited by examiner

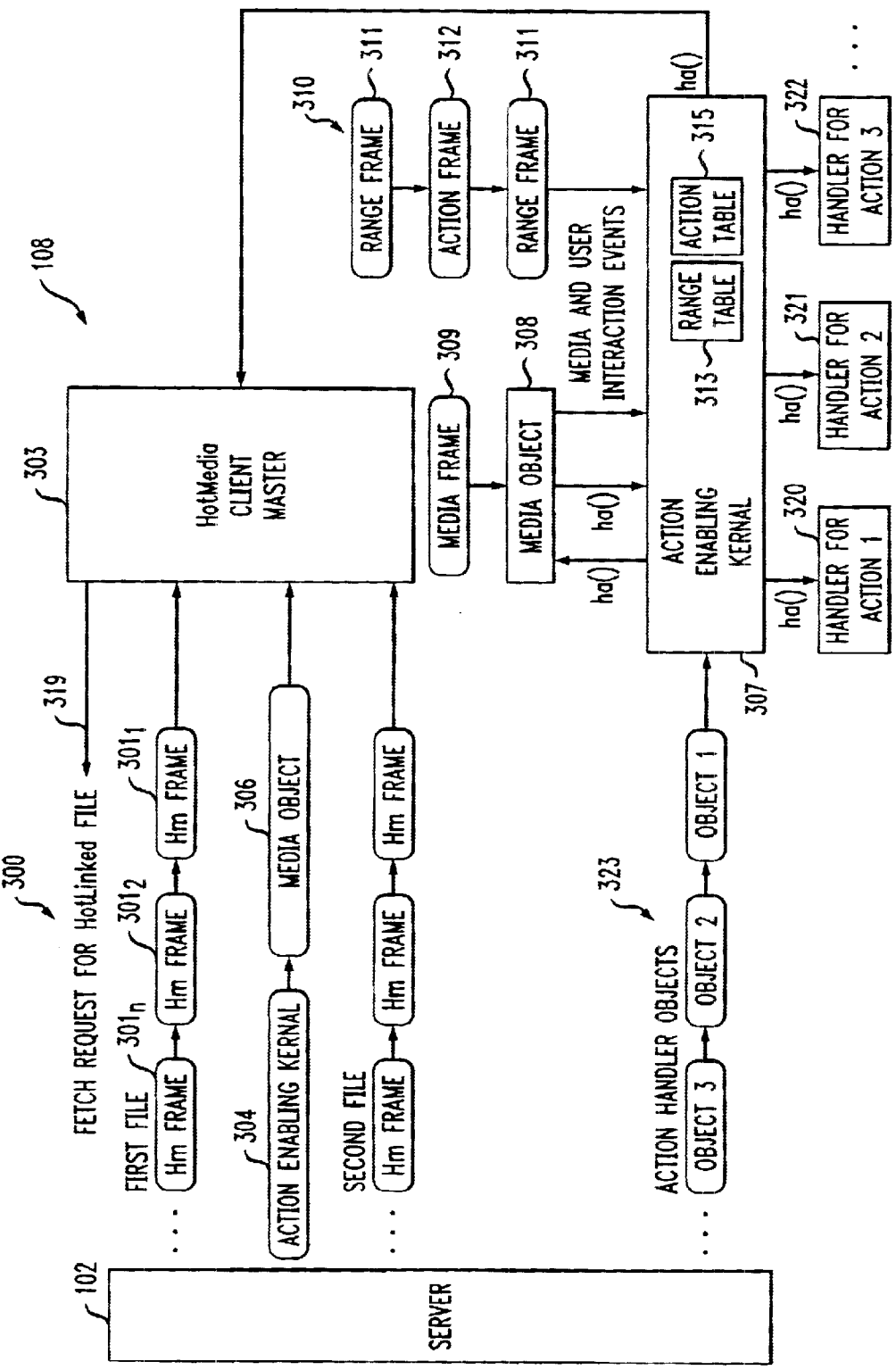
FIG. 3A ACTION ENABLEMENT SCHEMATIC

FIG. 5B1
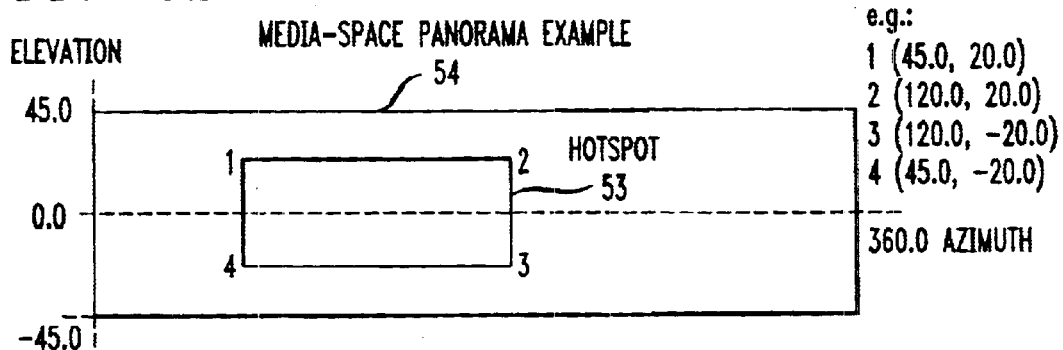
FIG. 5B2
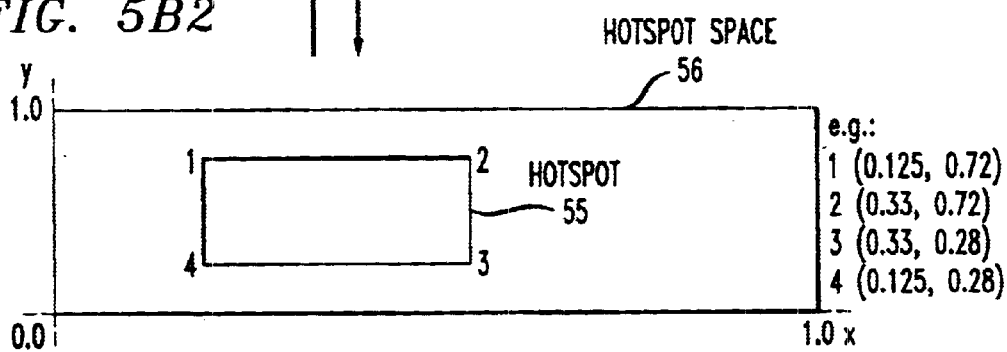
FIG. 5B3
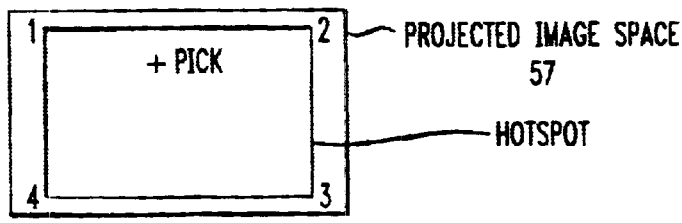

SYSTEM AND METHOD FOR UNIFYING HOTSPOTS SUBJECT TO NON-LINEAR TRANSFORMATION AND INTERPOLATION IN HETEROGENEOUS MEDIA REPRESENTATIONS

This application claims the benefit of the filing date of provisional application No. 60/136,390, filed May 27, 1999 and assigned to the same assignee as that of the present invention.

Related Applications, all of which are assigned to the assignee of the present invention and fully incorporated herein by reference:

(1) Ser. No. 09/376,102, entitled "Secure Electronic Content Distributions on CDS and DVDS," filed Aug. 17, 1999.
(2) Now U.S. Pat. No. 6,448,980, entitled "Personalizing Rich Media Presentation Based on User Response to the Presentation," filed Oct. 9, 1998.
(3) Now U.S. Pat. No. 6,230,162, entitled "Progressive Interleaved Delivery of Interactive Descriptions and Renderers for Electronic Publishing of Merchandise," filed Jun. 20, 1998.
(4) Ser. No. 09/447,585, entitled "System and Method for Adaptive Delivery of Rich Media Content to a User in a Network Based on Real Time Bandwidth Measurement and Prediction According to Available Bandwidth" filed Nov. 23, 1999.
(5) Now U.S. Pat. No. 6,256,921, entitled "Framework for Progressive Hierarchical & Adaptive Delivery of Rich Media Presentations and Associated Meta Data", filed Mar. 12, 1999.
(6) Ser. No. 09/438,493, entitled "A System and Method of Enriching Non-Linkable Media Representation to the Network by Enabling an Overlying Hotlink Canvas," filed Nov. 12, 1999.

BACKGROUND OF INVENTION

1. Field of Invention

This invention relates to systems and methods of operation for delivery of multi-media content including hotspots to end users. More particularly, the invention relates to systems and methods for unifying hotspots subject to non-linear transformation and interpolation between heterogeneous media representations.

2. Background Discussion

In recent years, there has been a sizable growth in the use of Rich Media over the Worldwide Web as more and more individuals and institutions begin to realize the Web's potential and broad range of applications, including electronic commerce, education, training, news, etc. Examples of Rich Media include, inter alia, animation, audio, 3-D, panoramas and videos. There are two apparent clusters of media in Rich Media technology. One at the low end and the other at the high end which hamper effective deployment of some Rich Media in Internet based applications. A "low end" cluster comprises static images and simple non-interactive animation (typically animated—Graphic Interface Formats (GIFs) which are easy to deploy and therefore have widespread usage. The high end cluster comprises richer and more natural experiences with larger interactivity, such as panoramas, 3-D, streaming audio/video and composite media (e.g., MPEG-4). The difficulty of deployment has limited widespread usage of Rich Media. A novel scalable architecture called HotMedia bridges the gap between the two clusters thereby achieving widespread WEB penetration. Hot Media is described in IBM Research Report RC21519 entitled "The Hot Media Architecture:Progressive & Interactive Rich Media For The Internet" by K. G. Kumar et al. published July, 1999 A key feature of HotMedia is a suitable delivery file format that contains heterogeneous compositions of media bit streams as well as meta data that define behavior, composition and interaction semantics. The delivery file format enables creation of light weight single file representation of interactive, multi-stage presentations resulting in multiple media type content. At the core of a HotMedia client is a smart content algorithm that infers media type from the incoming data stream and fetches the media renderer components, user-interface components and hyper-linked action components, all just in time, resulting in progressive and context driven enrichment of the user experience. Details related to HotMedia architecture are described in Ser. No. 09/268,537 entitled "Framework for Progressive Hierarchical and Adaptive Delivery Rich and Media Presentation and Associated Data", supra.

Often, instances of Rich Media incorporate "hotspots" to other presentations to expand a user's experience. The process of clicking on a hotspot in a media for transfer to the another presentation is also referred to as "hotlinking" or "hyperlinking" which is further described in U.S. Pat. No. 5,819,78 entitled "Networking Using Stegnographically Embedded Data Object" issued Nov. 24, 1198 and U.S. Pat. No. 5,918,012 entitled "Hyperlinking Time Based Data" issued Jan. 29, 1999.

Prior art related to mechanisms for accessing hotspot include the IBM PanoramIX system, which displays a hotspot by coloring a low resolution version of a panorama with pixels of a special color. During display of the projected image at the client station, those image pixels that happen to hover over the specially colored pixels in the secondary panoramic image are modified to show that they represent a hotspot. As a result, hotspot areas may be an arbitrary shape at the expense of a size and logistical problems of maintaining the second image. Another mechanism for accessing hotspot includes Interaction Pictures Incorporated (IPIX) in which a "click here" icon on view window over the hotspot masks the exact shape of the pick or click area.

One problem in "hotlinking" between heterogeneous media involves unifying hotspots in different forms of Rich Media. Depending upon the media, some hotspots transform linearly from one media to another media. In other cases, hotspots transform non-linearly from one media to another media.

Ordinarily, media project onto a display screen with scaling, translation, shear and rectilinear projection, which causes straight lines in the media to map to straight lines in the display. Linear translation allows hotspots (where "clicking" or "picking" on a hotspot using a mouse to cause action) to be defined by an outline of the two points connected by a straight line.

However, for some media, e.g., panoramas, the mapping from the media to the display is non-linear and the straight lines become curved after transformation. In such media, reverse transformation from the display to the media also creates curved lines. For these media, hotspot outlines cannot be defined by widely separated points, because interpolating straight lines between the points and the media space will cover a slightly different area than interpolating straight lines between points in the display space.

The variety of transformations for media to be displayed and re-stored are a problem for an action handler associated with a display for responding to a "picked" hotspot. Action handlers in the client station perform the transformations between arbitrary spaces. However, non-linear media can be arbitrary curved surfaces (e.g., cylinders or spheres). It is unreasonable for a general-purpose action handler to account for all possible media non-linearities and display options. An action handler must have the following characteristic to overcome problems in unifying hotspot locations between heterogeneous media representation:

(1) Store hotspot (where clicking or picking takes place) separate from the media.

(2) Store hotspot in a way independent of non-linearities of a media.

(3) Detect if picks occur on the hotspot even though the media may have non-linear distortion; and (4) Provide means for non-linear media to communicate a uniform storage method in the action handler.

Providing a systems and methods to unify hotspots subject to non-linear transformation and interpolation in heterogeneous media representations will advance the growth and the utility of Rich Media for a wide variety of applications in the World Wide Web.

SUMMARY OF THE INVENTION

An object of the invention is a system and method for translating hotspots from one media to another media without significant alteration of hotspot locations in both media.

Another object is a system and method for unifying hotspots subject to linear and non-linear transformation in heterogeneous media representations.

Another object is a network and method of operation for transforming coordinates for hotspots in mixed media to corresponding coordinates for hotspots in another media.

Another object is an action handler and a network implementing HotMedia Architecture to store hotspots separate from the media and independent of non-linearity of the media.

Another object is an action handler and a network implementing HotMedia Architecture a which detects that a hotspot is clicked or picked even though the media may have non-linear distortions.

Another object is an action handler and a network implementing HotMedia Architecture which enables non-linear media to communicate coordinates in a uniform storage method.

Another object is an action handler and a network implementing HotMedia Architecture in which hotspot are stored in a Hotspot coordinate system for media programs.

Another object is an action handler and a network implementing HotMedia Architecture in which display and picking in an image is converted to a hotspot coordinate system for media programs before sending queries to the action handler.

These and other object features and advantages are achieved in a system including a content creator and delivery station coupled to a network for delivery of Rich Media presentations to at least one client station, including presentation and user interaction logic in a client terminal. The presentation and user interaction logic includes a client master control module coupled to at least one action handler. The content creator creates media, for example, stills, animation, and panorama including hotspots for delivery to the client station and display as a projected image for user interaction with the hotspot. The hotspot(s) is expressed in the media as an area defined in terms of a new Euclidean rectangular coordinate system i.e., a hotspot coordinate system. The new hotspot coordinate system is used by the master control module in the transformation and mapping of the media image hotspot coordinates into the new corresponding coordinates of a hotspot location in a projected image in a display for user interaction. In some cases, the image coordinates and the media do not necessarily map directly into corresponding coordinates in the projected image. Flat media can be linearly transformed to a projected image coordinates. However, panorama media require non-linear transformation of media coordinates to project an image coordinates in the display. The coordinates for the media hotspot in the hotspot coordinate system are stored in a centralized action handler independent of the non-linearities in the media. Media non-linearities and display options are handled by the media programmer via four specified functions at the media level outside of the action handler. The division of labor devised between the action handler and the media programmer is key to how a general-purpose action handler can deal with arbitrary media mappings for picking and display and also deal with media discontinuities and singularities. A user selecting or picking a hotspot in the projected image at the client station may cause the pick to fall outside of the corresponding hotspot for non-linear media delivered by the content creator station to the client terminal. The hotspot in the media and the projected image may be unified by increasing the number of points in the hotspot coordinate system area geometry defining the hotspot in the media. Increasing the number of points in the hotspot geometry makes more reliable that a pick will occur in a projected image and the hotspot will fall within the hotspot area in the media. When a projected image hotspot is picked by a mouse or other input device, a signal is transmitted to the media indicating coordinates of the input device with respect to the media. The media transforms the input coordinates into the hotspot coordinate system and queries the action handler for the storage of the hotspot at the location of the image device. The action handler returns the hotspot, if any, at the query location. The media displays the hotspot, if any, at the location of the input device location on the media. When the pick falls within the media hotspot area and is actuated, the action handler initiates the events associated with the picked hotspot in the projected image. When the pick falls outside of the media hotspot area, the action handler does not initiate an event. Converting the image coordinates to the hotspot coordinate system makes an action handler responding to picking more reliable regardless of the media form of the Rich Media presentation.

DESCRIPTION OF THE DRAWING

The invention will be further understood from a detailed description of a preferred embodiment taken in conjunction with an appended drawing, in which:

FIG. 3A is a representation of a master module and action enabler in the client station of FIG. 1 for responding to a picked hotspot in a panorama contained in Rich Media and displaying the hotspot on a projected image at the client station.

FIGS. 5B1–3 are a representation of a new hotspot coordinate system for overcoming the pick mistake in FIG. 5A.

DESCRIPTION OF PREFERRED EMBODIMENT

Figure 1:
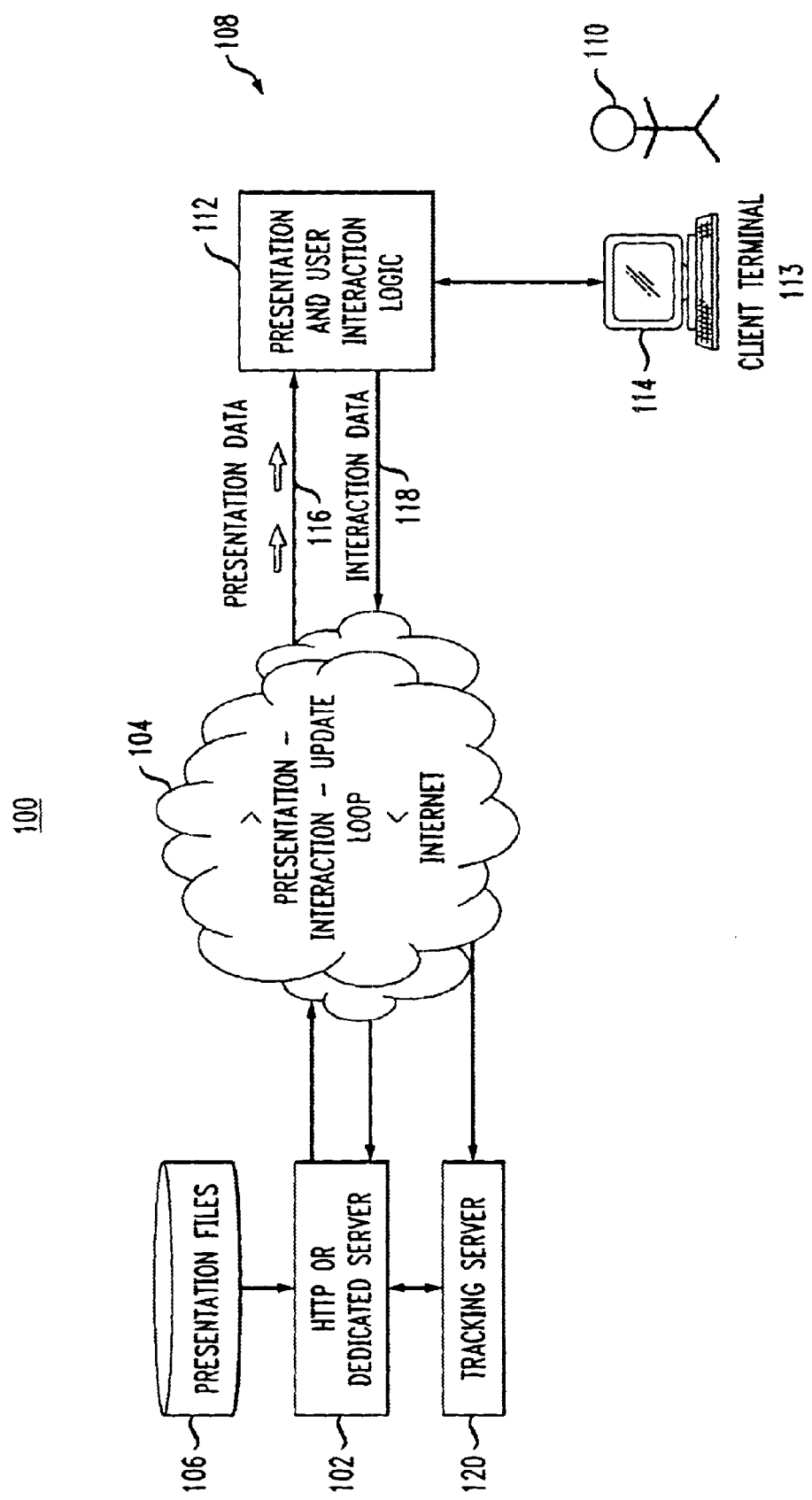
FIG. 1 is a representation of a content creator delivery server providing Rich Media in a data stream via a network to a client station including a master control module and action handlers for responding to a hotspot(s) in the Rich Media in accordance with the principles of the present invention.

Before describing the invention, further background related to the problem of unifying hotspots in different media is believed appropriate for better understanding of the invention. Hotspots are installed in the media by an author as a part of creating multi media content for delivery to users. The hotspot is associated with a virtual geometrical area defining the location of the hotspot in the media in terms of rectilinear coordinates. Typically, the geometrical coordinates for hotspot are stored in a table. The hotspot is selected in the media by a user traversing the hotspot area using an I/O device e.g., mouse, stylus etc. and clicking the mouse or pointing the stylus at the location of hotspot as the media is traversed. A processor accesses the hotspot based on the location of the I/O device which is tracked by the processor. If the I/O device coordinates fall within the coordinates of the hotspot geometrical area, the processor is activated to carry out an action associated with the hotspot. Hotspot coordinates in the media must be translated or transformed to corresponding coordinates in a projected image of the hotspot in a display at the client station. Ordinarily, the media hotspot projected onto a display screen translates straight lines in the media to straight lines on the display. As a result, hotspots can be defined by an outline of two points connected by straight lines. However, for some media, e.g., panoramas, the mapping from media to display is non-linear and straight lines in the projected image become curved in the display after translation. Likewise, straight lines in the display can become curved lines in the media. The media hotspot outlines cannot be defined by widely separated points, because interpolating straight lines between the points and the media space will cover a slightly different area than interpolating straight lines between points in the display space.

A solution to non-linear mapping between media and display in finding a hotspot is to interpolate the curve line of the non-linear media between widely separated points. When an arbitrary number of points in a straight line is added between widely separated points then all points may be transformed back and forth between the media and the display forming a piecewise linear approximation of the correct curve line that arises in the non-linear transformation. The inaccuracy of this piecewise-linear boundary can be improved to any desired level by increasing the number of interpolated points between the widely separated points at the cost of more processing time for the picking action.

A uniform geometrical representation for hotspot in non-linear media is a rectangle. However, representing all media hotspot as rectangles introduces other problems which must be solved where the rectangle could be an effective representation. A cylindrical space, as used for example in a panorama, has to be cut before being unrolled into a rectangle. The cut ends may match up in a hotspot which may have crossed the board and be cut in two. As will be described hereinafter, one solution is to break the hotspot into two hotspot that share an edge where the cut was made. Another solution is move the hotspot to the far end of the rectangle so that the hotspot dangles off the end, including within it any other smaller or overlapping hotspot.

Now turning to FIG. 1, a multimedia information system 100 implements HotMedia architecture and includes an HTTP or dedicated server 102 coupled to a multimedia network 104, typically the Internet. The server is further coupled to a storage media 106 which stores presentation files in various media including Rich Media created by a standard authoring tool (not shown) for delivery to a client station 108 coupled to the network. The client station includes presentation and user interaction logic 112 accessed by a user 110 through a client terminal device 113 including a display 114. The presentation files 106 are supplied to the client station as streaming data on a presentation bus 116. The user's interaction with the presentation is returned to the server 102 as interaction data on a bus 118. The presentation files interaction data are exchanged in the network between the server and the client station using standard HTTP protocol. A user interaction tracking server 120 monitors the user intention, preference and attitudes with respect to the presentation files and exchanges data with the server 102. The details of the system 100 are further described in Ser. No. 09/268,537 entitled "Framework for Progressive Hierarchical and Adaptive Delivery Rich Media Presentation and Associated Meta Data", supra.

Figure 2:
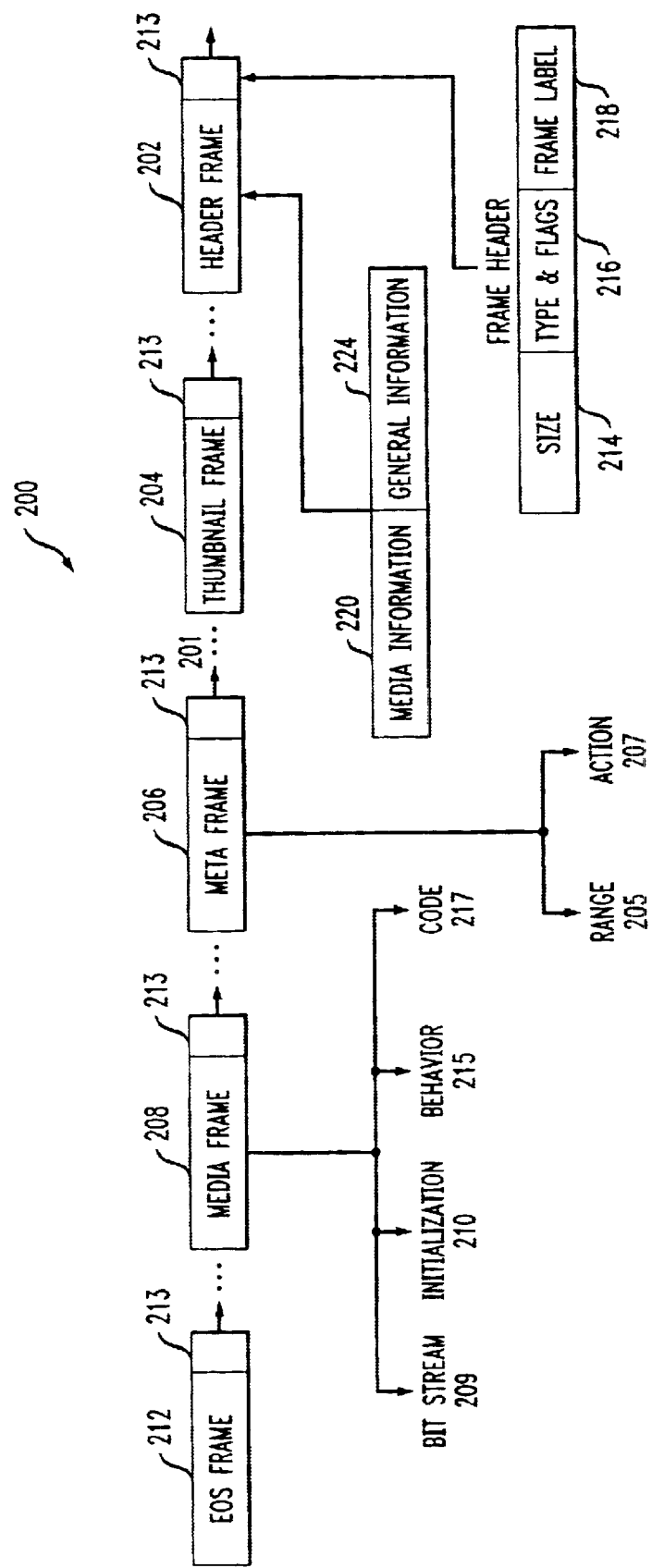
FIG. 2 is a representation of the data stream in the system of FIG. 1.

FIG. 2 shows a hot media presentation file 200 in a framework 201 which is essentially a sequence of frame types comprising header 202, thumbnail 204, meta data 206 and media 208 and end of stream 212. The first frame is the header frame 202. The header frame is actually followed by the thumbnail frame 204. After these frames, a sequence of other frames occurs in a no premandated order or number. The header frame is only one whose presence is mandatory in the format. The most degenerate yet useful version would have a header frame followed by a thumbnail frame 204. Media frames 208 appear in all other instances. Meta frames 206 are present only in cases where non-default behavior and configuration are desired or cases where hyperlink action semantics are to be incorporated. The frames have similar twelve (12) bit initial section which enables a uniform procedure for the identification to a type and frame label as well as the determination of their size. HotMedia file format is created at minimum overhead and maximum modularity. Further details of the file format are described in Ser. No. 09/169,836, entitled "Personalizing Rich Media Presentations Based on User's Response to the Presentation," supra.

Turning to FIG. 3A, the client station 108 will now be described in conjunction with FIGS. 1 and 2 in processing a presentation file 106 in the format of the data stream 200. The server 102 provides a first streaming HotMedia file 300 comprising a series of frames $301_1 \ldots 301_n$, previously described in conjunction with FIG. 2. The frames $301_1 \ldots 301_n$ may contain meta frames with range and action subtext. A HotMedia client master module 303 receives the frames 300 and as soon as a meta frame is encountered with range and action subtext, the master determines if an action enable kernel 305 has been created. If not, the master module 303 obtains action enabling kernel codes 304 and media object codes 306 from the server 102 and instantiates the codes 304 in an action enable kernel 307. The master module 303 displays the codes 306 as a media object 308 on the client terminal 113. The master module 303 delivers a sequence of the frames 300 to the proper owner. Media frames 309 are delivered to the media object handling the media track. Meta frames 310 with range subtext 311 and action subtext 312 are delivered to the action enabling kernel 307 which stores the range and action subtexts in tables 313 and 315, respectively. The action enabling kernel 307 activates an action handler 320, 321, 322 according to the event linked to the hotspot.

The centralized action enabler kernel 307 also allows decoupling of events from the hotspot in the display. The media translates mouse clicks and view changes to the action enabler, which can then test for mouse with polygon or polygon touching polygon or polygon within polygon and then performing action without the media needing any action code. The centralized action enabler need not know what media specific non-linear mapping is used between the media and projected image. The media handles all non-linearities, which differ from one media to the next so that the centralized action enabler need not have special code to deal with not even to the point of doing a call back to the media. For example, hotspots in media space are mapped into a projected image by the media before display. Another example, a mouse click in a projected area is mapped to the media space by the media before being sent to the action enabler. More specific details on the operation of the client station are described in Ser. No. 09/438,493, entitled "A System and Method of Enriching Non-linkable Media Representations in a Network by Enabling an Overlying Hotlink Canvas," supra.

Figure 3B:
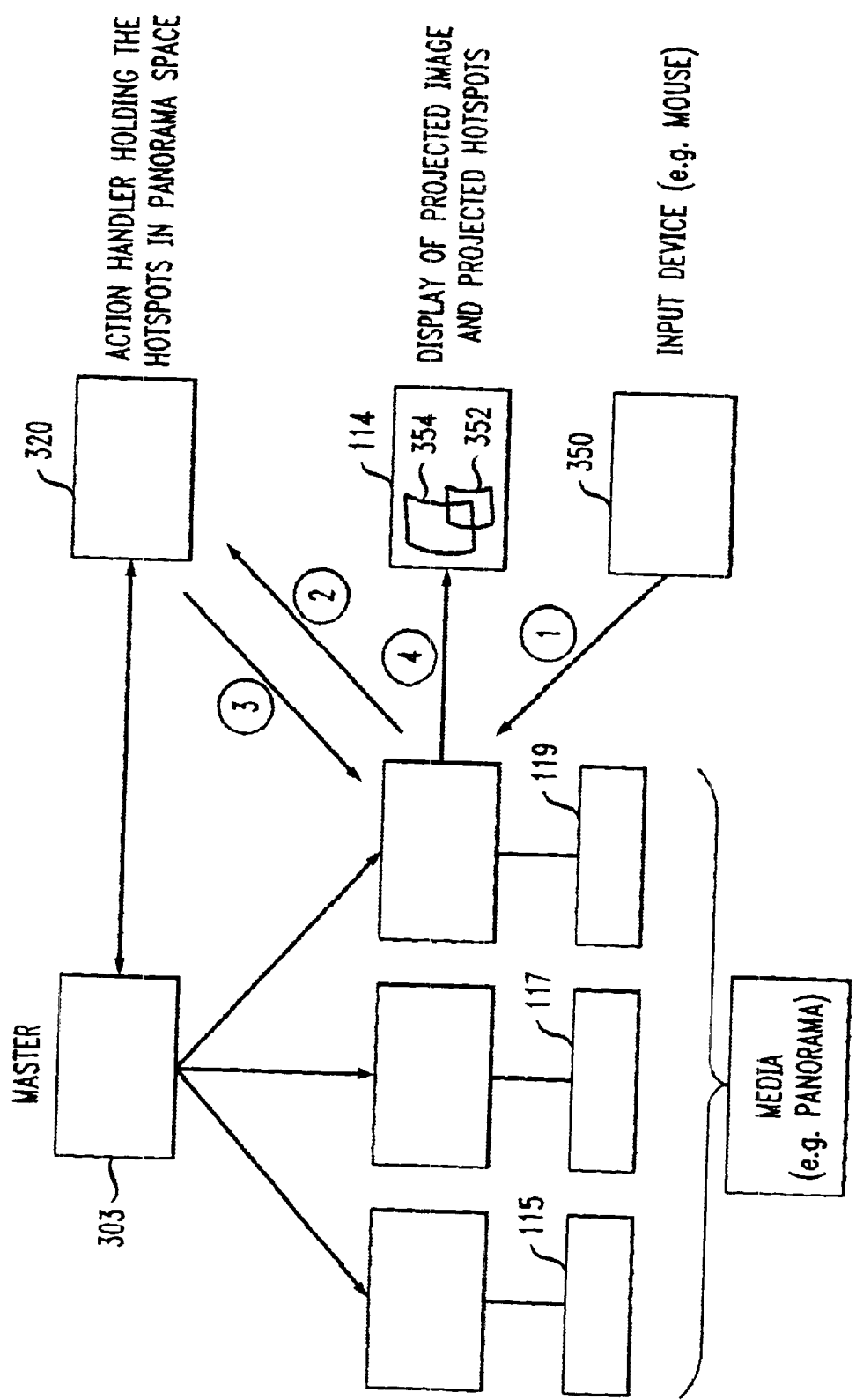
FIG. 3B is a flow diagram for processing the hotspot in FIG. 3A.

FIG. 3B will be described in conjunction with FIGS. 1 and 3A and shows another view of the flow of information between the server 102 and the client station 108 in processing a hotspot. In step 1, an input device 350 e.g. a mouse or stylus (not shown) is used to pick a hotspot 352 in a projected image 354 in the display 114. The coordinate values of the pick are sent to the media server 102 providing media tracks 115, 117, 119 to the master module . In step 2, the media server 102 transforms the input pick coordinates and queries the action handler 320 in the client station for stored hotspot at the location of the input device. In step 3, the action handler returns the hotspot locations, if any, at the query location to the media server 102 . In step 4, the media server displays the hotspot in the projected image in the client terminal at the input device location known to media in step 3. When the pick falls within the media hotspot area, the action handler or media initiates events associated with the picked hotspot in the projected image. When the pick falls outside the hot spot, no action is taken by the action handler.

Figure 4A:
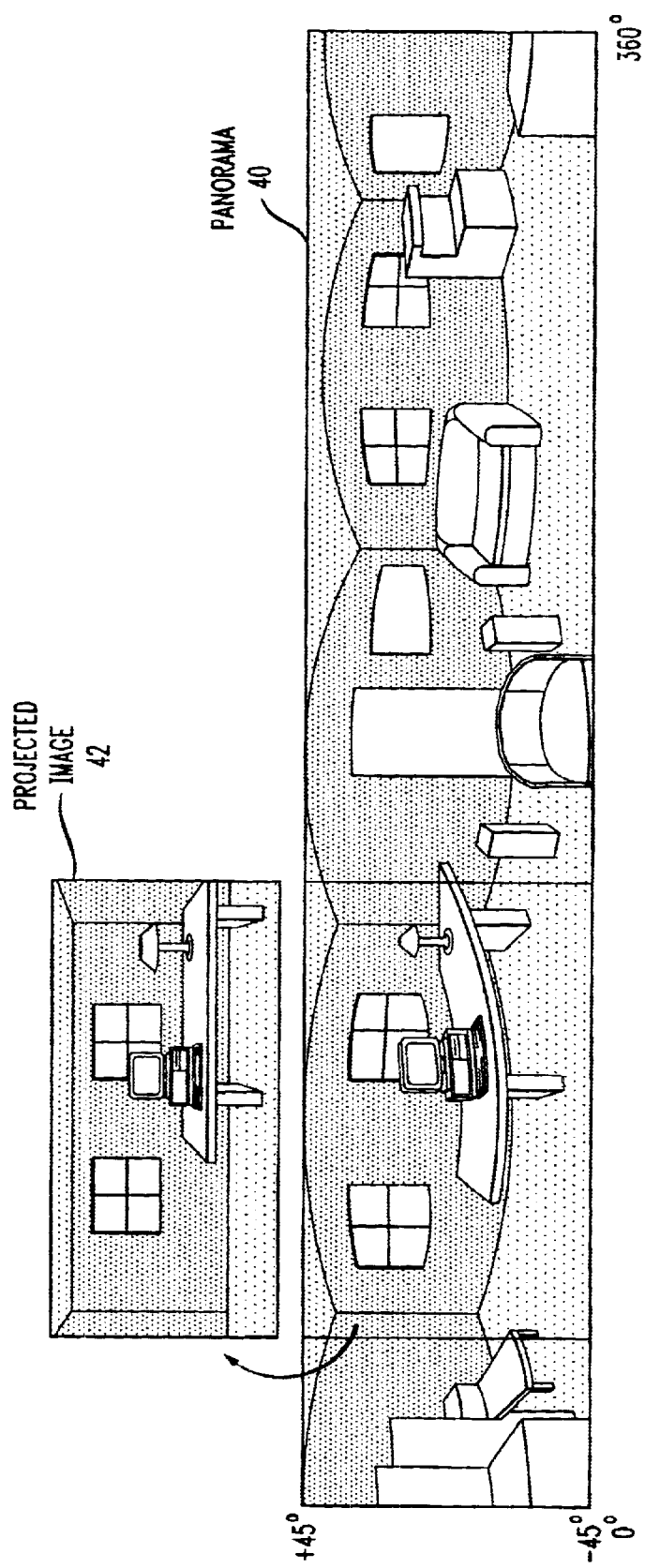
FIG. 4A is a representation of a panorama projected onto an applet window at the client station in FIG. 1.

Having described the system in which hotspot are transmitted between the server and the client station, a description will now be provided for installing a hotspot in media such that a new geometry coordinate system associated with the hotspot will ensure that picking of the hotspot will fall within the associated geometrical area to activate an action and not outside of the geometrical area in which case the pick will fail. Several geometries will now be described for installing a hotspot, as follows:

FIG. 4A shows an example of the current art of projecting a non-linear medium, e.g. a panorama 40, onto a display screen 42 in the client terminal 113 (See FIG. 1). The projection method is described, for example, in Ser. No. 08/723,969 enitied "Method and Apparatus for Viewing Panoramic Three Dimensional Scenes", filed Sep. 27, 1996, assigned to the assignee of the present invention and fully incorporated herein. Ser. No. 08/723,969 describes all the necessary mathematics and procedures for projecting the panorama 40 as a cylinder in a projected image. The cylinder represents the panorama as seen by an observer in the center. The panorama is then unrolled onto a plane to form a long, thin rectangle . A media track containing the panorama 40 has a left-right extent which corresponds to an azimuth of 0 to 360° and vertical extent of +/−45°. A portion of the panorama is mapped by a non-linear transformation to window as a rectangular applet space shown as the projected image 42 in the client station display 114.

Figure 4B:
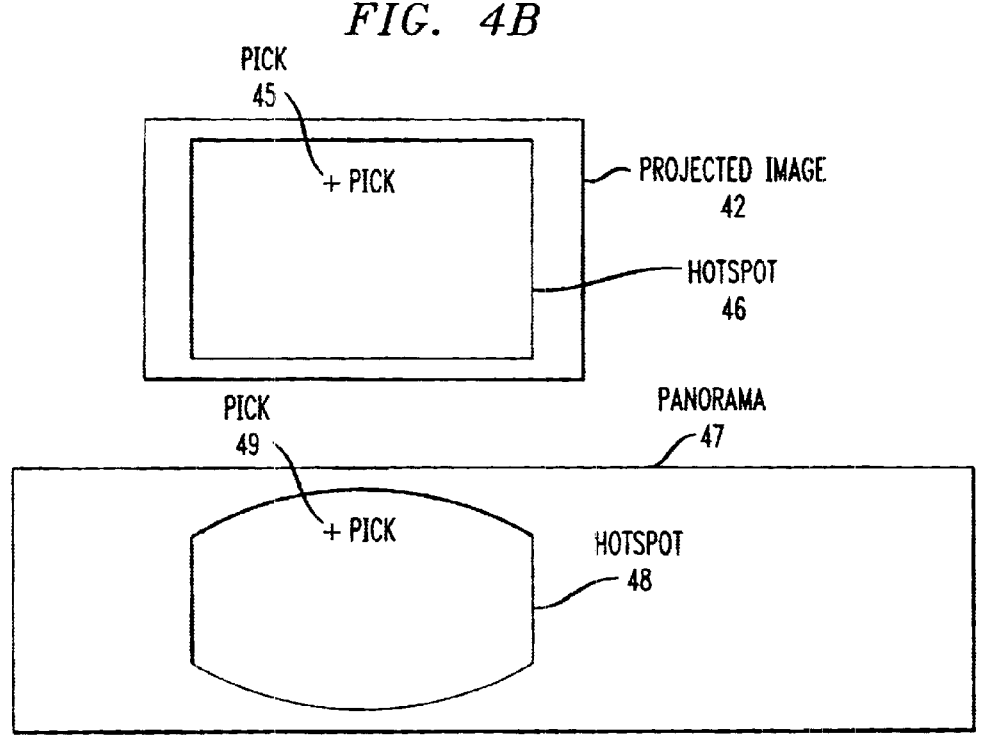
FIG. 4B is a representation of a pick in the applet window falling within a hotspot in the panorama of FIG. 4A assuming idealized hotspot geometry in a panorama.

FIG. 4B shows how picking a hotspot 46 in the far wall of the panorama would work with the action enabler 307 (See FIG. 3A) in an idealized system, which this invention approximates and generalizes to a multitude of non-linear media. Starting from the projected image 42, the user pick 45 is within a hotspot 46 (area within which picking is valid). In an idealized system, a rectangular hotspot in the projected image maps to a panorama 47 or other non-linear media as curved lines 48 that would bound the picking areas as will described for a lozenge-shaped area in the panorama defining the hotspot 48. For display purposes, the panorama hotspot 48 would be projected from the panorama shape to a rectangular shape 46 in the projected image 42. The user would pick 45 within the rectangle 46 in the projected image. The pick would be projected 49 into the panorama. Because the pick would have been inside the lozenge shaped hotspot 48 in the panorama the action enabler 307 (See FIG. 3A) would recognize that the wall had been picked and an action handler 320 (See FIG. 3A) would be initiated.

The traditional approach to picking is described in U.S. Pat. No. 5,912,670 entitled "Method and Apparatus for Overlaying a Bit Map Image on an Environment Map" and in Ser. No. 08/749,749 entitled "Method and Apparatus for Generating and Displaying Hotlinks in a Panoramic Three Dimensional Scene", filed Nov. 15, 1996, both assigned to the assignee of the present invention and fully incorporated by reference herein. Both of disclosures approximate the curved area for picking on the panorama by using a largely blank image with pixels filled in the area to be picked with a distinguished color that gives the name of the pick. The projected image shows this area filled in (not outlined) with slightly jagged edges from aliasing. These disclosures are specialized to panoramas and do not lend themselves well to outlining the area to be picked. Nevertheless the disclosures contain all the necessary mathematics and procedures for projecting a hotspot in a cylindrical panorama to a projected image in circumstances similar to FIG. 4B using the following relationships:

Equations 1: (projectedX, projectedY)=Media_to_ProjectedImage_space(mediaX, mediaY)

which has an inverse function:

Equation 2: (mediaX, mediaY)=ProjectedImage_to_media_space(projectedX, projectedY)

The present invention improves upon the prior disclosures by interposing an intermediate space between the media space and the projected image and provides mapping functions to and from this intermediate space only. In order to treat spaces uniformly and simply, straight lines are always interpolated between points. The coordinate system of this space makes the hotspot independent of the media type as described below. Specifically, the present invention uses, not two but four relationships or functions to go between media space and the projected image by way of a new space, termed "hotspot space", which is a uniform way to represent any spatial media space whether image, panorama, sphere, etc.

Figure 5A:
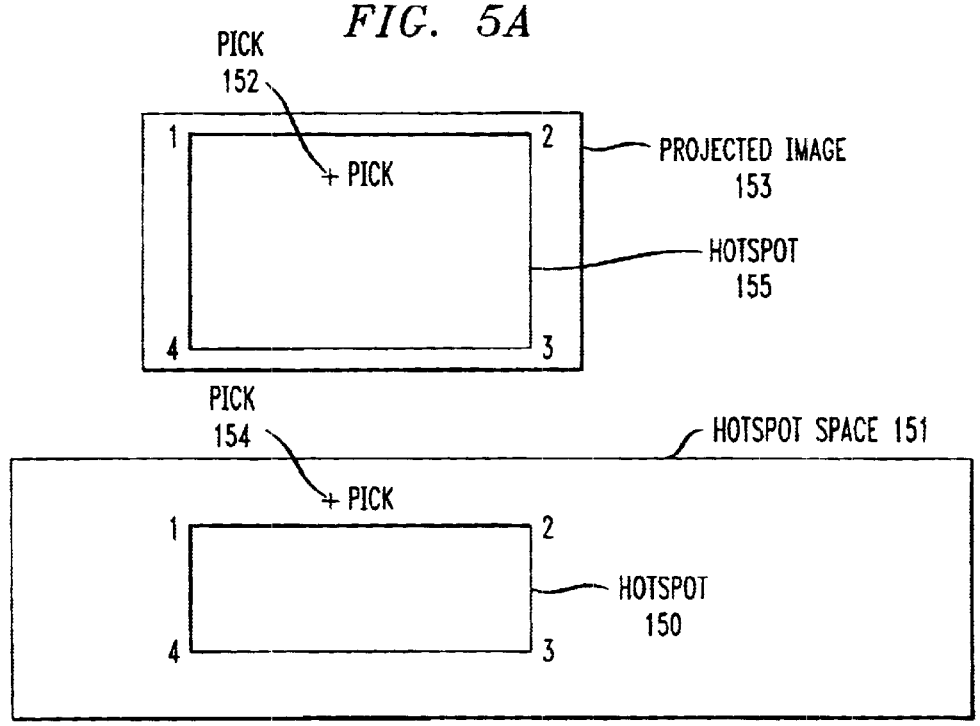
FIG. 5A is a representation of a mistake in the pick of FIG. 4A, because of a simplified representation of the hotspot.

FIG. 5A is a representation of a mistake in the pick of FIG. 4A, because of a simplified representation of the hotspot. A hotspot 150 in a panorama 151 is defined by a closed loop of points, labeled 1–4 in a rectangle representing a space for an arbitrary non-linear media, indexed in a uniform way. The four points determining the hotspot are projected from the panorama to the projected image 153. The media shows a quadrilateral hot spot to the user so straight lines are displayed between the four points. A user selects pick 152 thinking that the pick will be recognized by the action enabler. When the pick is projected back into the panorama, the pick 154 falls outside the hot spot area in the panorama and the action enabler 307 (See FIG. 3A) does not recognize the pick. As a result an action handler is not initiated.

FIGS. 5B1–3 are a representation of a new hotspot coordinate system for overcoming the pick mistake in FIG. 5A. In FIG. 5B1, a hotspot 53 is shown in a media space panorama 54 having an azimuth of 0 to 360 degrees and an elevation of −45 to +45 degrees. The hotspot 53 in the panorama 54 is converted into a "hotspot space" 56 using a new, uniform hotspot coordinate system, shown in FIG. 5B-2. The "hotspot space" 56 is uniform in that rectilinear coordinates go from 0 to 1 in x and y for all media. The rectilinear coordinates make the hotspot independent of the special units (degrees, radians, pixels, centimeters, etc.) of the various media. A hotspot 55 in the "hotspot space" 56 having x, y values in the present example is represented by the following four x, y coordinate points labeled 1–4:

1: (0.133, 0.770)
2: (0.433, 0.770)
3: (0.433, 0.230)
4: (0.133, 0.230)

A media author provides to the action enabler 307 (See FIG. 3A) four functions to the mapping between the media 54 and projected image 57 shown in FIG. 5B-3. It is worth emphasizing that these functions are not a part of the action handler; they are part of the media programming by the media author. The functions show the division of labor between the general-purpose action handler and the media author. Indeed this division of labor is key to why the action handler of this embodiment is able to work without regard to particular media non-linearities, which are embedded in these four user-written functions.

In the case of the panorama 54 with azimuth 0–360 degrees and elevation of −45 to +45 degrees shown in FIG. 5B-1, two of the functions are provided by the media author to convert between the media space 54 and the "hotspot space" 56, as follows:

```
f(1)   (hotspotX, hotspotY) = Media_to_hotspot_space(mediaX, mediaY)
       {
         azimuth = mediaX;
         elevation = mediaY
         hotspotX = azimuth/360.0;
         hotspotY = (elevation + 45.0)/90.0;
       }
f(2)   (mediaX, mediaY) = Hotspot_to_media_space
       (hotspotX, hotspotY)
       {
         mediaX = azimuth = 360.0 * hotspotX;
         mediaY = elevation = (90.0 * hotspotY)/45.0;
       }
```

Two other functions provided in FIG. 5B-2 by the media author convert between "hotspot space" 56 and the projected image 57 in FIG. 5B-3. These functions can be implemented using Equations 1 and 2 described plus other methods disclosed in U.S. Pat. No. 5,912,670, etc, as follows:.

```
f(3)   (hotspotX, hotspotY) = ProjectedImage_to_hotspot_space(projectedX,
       projectedY)
       {
         (mediaX, mediaY) = ProjectedImage_to_media_space(projectedX, projectedY);
         (hotspotX, hotspotY) = Media_to_hotspot_space(mediaX, mediaY);
       }
f(4)   (projectedX, projectedY) = Hotspot_to_ProjectedImage_space(hotspotX,
       hotspotY)
       {
         (mediaX, mediaY) = Hotspot_to_media_space(hotspotX, hotspotY);
         (projectedX, projectedY) = Media_to_ProjectedImage_space(mediaX, mediaY);
       }
```

Function 3 and 4 [ProjectedImage_to_hotspot_space( ) and Hotspot_to_ProjectedImage_space( )] may instead be implemented more efficiently by direct computation instead of calling the two other methods.

Summarizing, the functions for the new hotspot coordinate system are as follows:

f(1). (hotspotX, hotspotY)=f(1) Media_to_hotspot_space(mediaX, mediaY).

f(2). (mediaX, mediaY)=f(2) Hotspot_to_media_space (hotspotX, hotspotY).

f(3). (hotspotX, hotspotY)=f(3) ProjectedImage_to_hotspot_space(projectedX, projectedY)

f(4). (projectedX, projectedY)=f(4) Hotspot_to_ProjectedImage_space(hotspotX, hotspotY)

Since these four functions are not part of the action enabler but provided in the media by the author, the action enabler may now deal with hotspots for any 2D media without knowing the media coordinates or distortions. The four media-author-supplied mapping functions f(1)–f(4) free the action enabler from all knowledge of media mappings and allow the action enabler 307 (See FIG. 3A) to handle any linear or non-linear 2D media mappings However, the technique of interposing an intermediate hotspot coordinate system and isolating media space to user-supplied functions may introduce problems which can be overcome, as will be described hereinafter.

Figure 6:
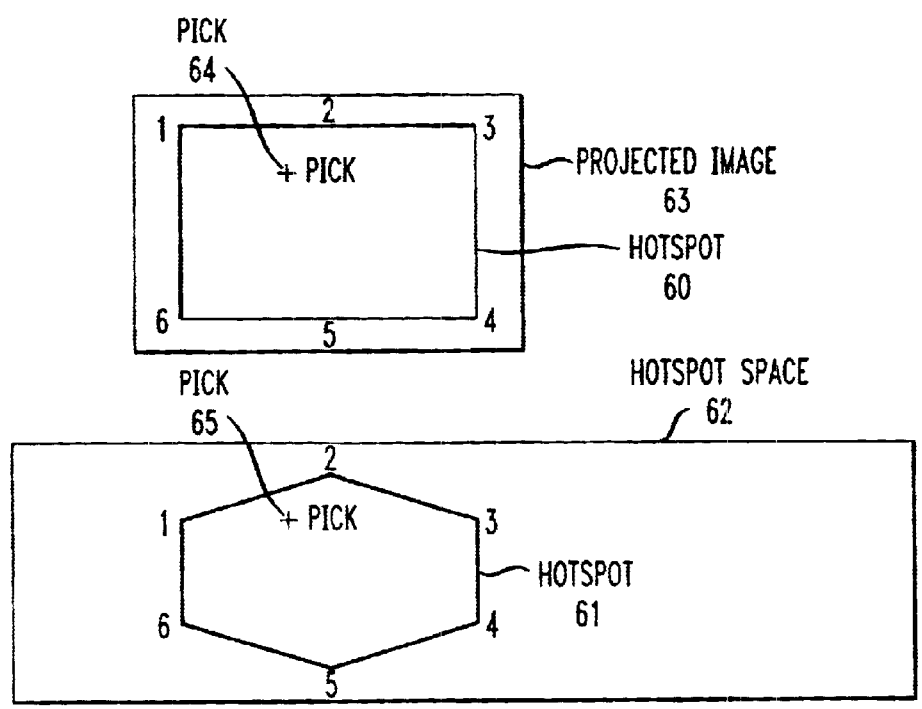
FIG. 6 is a representation of a pick in a projected image and the transformation of the pick using a hotspot representation that more closely matches idealized hotspot geometry in a panorama.

In FIG. 6, increasing the number of points defining the quadrilateral area of the hotspot 60 in projected image 63 makes picking more reliable and corrects the mistake in FIG. 5A. The increased number of points provides a more detailed representation of the hotspot for picking. For example, a polygon 61 determined by six points in the hotspot-space representation of the panorama 62 defines the hotspot. The action enabler 307 (See FIG. 3A assumes straight lines between the points. The six points (up from four in FIG. 5A) determining the hotspot are projected from the hotspot-space representation of the panorama 62 to the projected image 63 and vice-versa. The media shows a quadrilateral hotspot 60 to the user which displays straight lines between the six points as shown in the projected image. The user selects pick 64 within the quadrilateral in the projected image 63 thinking that the pick will be recognized. The pick is projected into the panorama. Because the pick 64 is projected inside the polygon 61 pick 65, the action enabler recognizes that the pick and initiates the action handler. The method for specifying and storing the hotspot in the panorama has extra steps and interpolates two new points:

The method for specifying and storing the hotspot initially is as follows:

1. A user working in the projected image picks one corner of a quadrilateral, e.g. Projected Image point 1, the upper left, (projectedUpperLeftX, projectedUpperLeftY)
   a. Obtain Hotspot point 1: Use ProjectedImage_to_ hotspot_space(projectedUpperLeftX, projectedUpperLeftY) to obtain (hotspotUpperLeftX, hotspotUpperLeftY).
2. The user working in the projected image picks a second corner of a quadrilateral, say Projected Image point 3, the upper right, (projectedUpperRightX, projectedUpperRightY)
   a. Obtain Hotspot point 3: Use ProjectedImage_to_ hotspot_space(projectedUpperRightX, projectedUpperRightY) to obtain (hotspotUpperRightX, hotspotUpperRightY)
3. The user working in the projected image picks a third corner of a quadrilateral, say Projected Image point 4, the lower right, (projectedLowerRightX, projectedLowerRightY)
   a. Obtain Hotspot point 4: Use ProjectedImage_to_ hotspot_space(projectedLowerRightX, projectedLowerRightY) to obtain (hotspotLowerRightX, hotspotLowerRightY)
4. The user working in the projected image picks the final corner of a quadrilateral, say Projected Image point 6, the lower left, (projectedLowerLeftX, projectedLowerLeftY)
   a. Obtain Hotspot point 6: Use ProjectedImage_to_ hotspot_space(projectedLowerLeftX, projectedLowerLeftY) to obtain (hotspotLowerLeftX, hotspotLowerLeftY)
5. Interpolate a point 2 between quadrilateral corners 1 and 3: as
   a. Set projectedUpperMiddleX= (projectedUpperLeftX+projectedUpperRightX)/2.0
   b. Set projectedUpperMiddleY= (projectedUpperLeftY+projectedUpperRightY)/2.0
   c. Obtain Hotspot point 2: ProjectedImage_to_ hotspot_space(projectedUpperMiddleX, projectedUpperMiddleY) to obtain (hotspotUpperMiddleX, hotspotUpperMiddleY)
6. Interpolate a point 5 between quadrilateral corners 4 and 6: as
   a. Set projectedLowerMiddleX= (projectedLowerLeftX+projectedLowerRightX)/2.0
   b. Set projectedLowerMiddleY= (projectedLowerLeftY+projectedLowerRightY)/2.0
   c. Obtain Hotspot point 5: ProjectedImage_to_ hotspot_space(projectedLowerMiddleX, projectedLowerMiddleY) to obtain (hotspotLowerMiddleX, hotspotLowerMiddleY)
7. Define and store the hotspot in the action handler as the sequence of points:
   a. Hotspot point 1: (hotspotUpperLeftX, hotspotUpperLeftY)
   b. Hotspot point 2: (hotspotUpperMiddleX, hotspotUpperMiddleY)
   c. Hotspot point 3: (hotspotUpperRightX, hotspotUpperRightY)
   d. Hotspot point 4: (hotspotLowerRightX, hotspotLowerRightY)
   e. Hotspot point 5: (hotspotLowerMiddleX, hotspotLowerMiddleY)
   f. Hotspot point 6: (hotspotLowerLeftX, hotspotLowerLeftY)

The method for picking is:

1. Receive mouse and mouse coordinates 64 in the Projected Image 63 when the mouse is clicked.
2. Set projectedX to mousse
3. Set projectedY to mouseY
4. Use ProjectedImage_to_hotspot_space(projectedX, projectedY) to obtain (hotspotX, hotspotY) 65, which is the location of the pick in hotspot space.
5. For each hotspot, compare the mouse pick position at (hotspotX, hotspoty) to see if it is inside the hotspot. Java has a method (a function) for this test, "inside ( )". Typical use: polygon.inside(x, y), which tests point x,y to see if it is in polygon "polygon."

If six points are not enough to make the hotspot display match the version stored in the media then more points can be added to the geometry. The number of points depends on the application needs and the degree of non-linearity in projecting the given part of the media to the applet window. Hotspot areas need not be rectangular. The areas may also be circles, ellipses or outlines traced around objects in the media.

Figure 7:
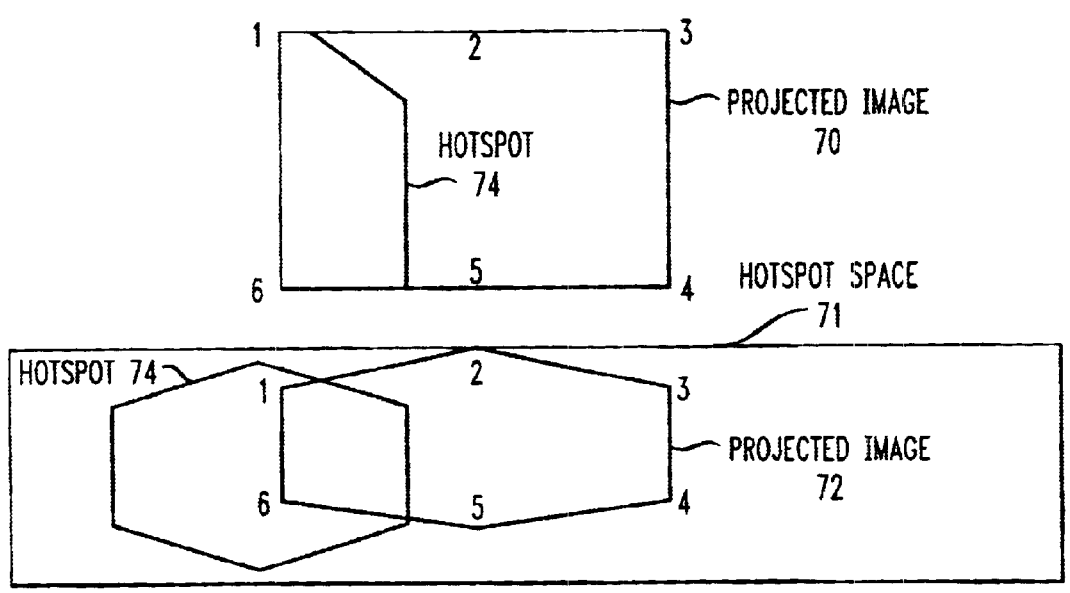
FIG. 7 is a representation of geometry of the outline of the projected image mapped to hotspot geometry in a panorama and represented by a polygon that approximates an ideal hotspot shape.

FIG. 7 is a representation of a geometry of an outline of a projected image mapped to hotspot geometry in a panorama and represented by a polygon that approximates an ideal hotspot shape. Specifically, FIG. 7 shows the boundaries of a projected image 70 mapped back to the hotspot-space representation of a panorama 71 as a polygon 72 intersecting hotspot 74. The media projects points around the edge of the projected image into the panorama where the intersection calculation is done by the action enabler using a conventional polygon-intersection algorithm. The projection and intersection calculations are done for every change (zoom, pan, etc) in the view and the results are compared with those of the previous view to detect when a hotspot is inside of, outside of, or intersecting the border of the projected image.

The method for mapping the projected image border to hotspot space is, as follows:

1. Define the projected image border as a sequence of 6 points:
   a. Projected image border point 1: (projectedUpperLeftX, projectedUpperLeftY)
   b. Projected image border point 2: (projectedUpperMiddleX, projectedUpperMiddleY)
   c. Projected image border point 3: (projectedUpperRightX, projectedUpperRightY)
   d. Projected image border point 4: (projectedLowerRightX, projectedLowerRightY)
   e. Projected image border point 5: (projectedLowerMiddleX, projectedLowerMiddleY)
   f. Projected image border point 6: (projectedLowerLeftX, projectedLowerLeftY)
2. Obtain Hotspot point 1: Use ProjectedImage_to_hotspot_space(projectedUpperLeftX, projectedUpperLeftY) to obtain (hotspotUpperLeftX, hotspotUpperLeftY).
3. Obtain Hotspot point 2: ProjectedImage_to_hotspot_space(projectedUpperMiddleX, projectedUpperMiddleY) to obtain (hotspotUpperMiddleX, hotspotUpperMiddleY)
4. Obtain Hotspot point 3: Use ProjectedImage_to_hotspot_space(projectedUpperRightX, projectedUpperRightY) to obtain (hotspotUpperRightX, hotspotUpperRightY)
5. Obtain Hotspot point 4: Use ProjectedImage_to_hotspot_space(projectedLowerRightX, projectedLowerRightY) to obtain (hotspotLowerRightX, hotspotLowerRightY)
2. Obtain Hotspot point 5: ProjectedImage_to_hotspot_space(projectedLowerMiddleX, projectedLowerMiddleY) to obtain (hotspotLowerMiddleX, hotspotLowerMiddleY)
3. Obtain Hotspot point 6: Use ProjectedImage_to_hotspot_space(projectedLowerLeftX, projectedLowerLeftY) to obtain (hotspotLowerLeftX, hotspotLowerLeftY)
4. Store the projected image border in the action handler as the sequence of hotspot points:
   a. Hotspot point 1: (hotspotUpperLeftX, hotspotUpperLeftY)
   b. Hotspot point 2: (hotspotUpperMiddleX, hotspotUpperMiddleY)
   c. Hotspot point 3: (hotspotUpperRightX, hotspotUpperRightY)
   d. Hotspot point 4: (hotspotLowerRightX, hotspotLowerRightY)
   e. Hotspot point 5: (hotspotLowerMiddleX, hotspotLowerMiddleY)
   f. Hotspot point 6: (hotspotLowerLeftX, hotspotLowerLeftY)

As in FIG. 6 the number of points defining the outline to be projected need not be 6, but can be any number depending upon the needs of the media track.

Figure 8A:
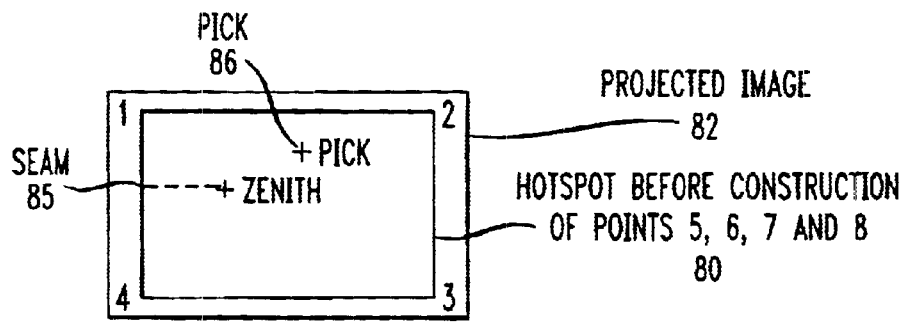
FIGS. 8A, B, and C are representations of a hotspot in a projected image mapped to a non-linear media containing a singularity where the media pixels crowd together at the top edge of the panorama.

In FIGS. 8A, B, C non-linear media can have singularities, points where pixels crowd together. An example is a zenith (straight up) for a panorama represented by a cylinder that crushes over a sphere so that the entire top of the panorama collapses into a single point. Because access to hotspot space is granted to the media programmer, special consideration for singularities can be programmed at the application level without need to change the underlying system.

Figure 8B:
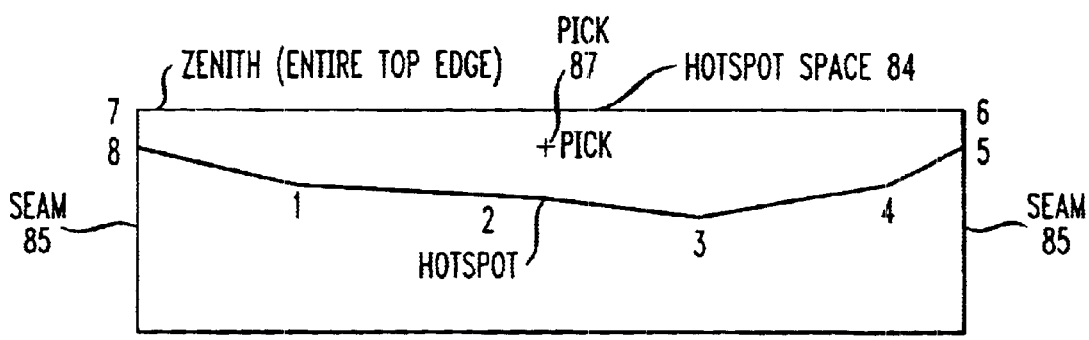

As an example, consider in FIG. 8A, a hotspot 80 with four vertices 1, 2, 3 and 4 in the projected image 82 as shown in FIG. 8. These vertices map to the circled 1–4 points located in the hotspot-space representation of the sphere 84, shown in FIG. 8B. To complete the hotspot, a closed loop 1–8 must be constructed in hotspot space 84 to encompass the area below the top edge of the panorama image. A method for closing the loop is as follows:

1. Define the projected image border as a sequence of 4 points:
   a. Projected image point 1: (projected1X, projected1Y)
   b. Projected image point 2: (projected2X, projected2Y)
   c. Projected image point 3: (projected3X, projected3Y)
   d. Projected image point 4: (projected4X, projected4Y)
2. Obtain Hotspot point 1: Use Projectedimage_to_hotspot_space(projected1X, projected1Y) to obtain (hotspot1X, hotspot1Y).
3. Obtain Hotspot point 2: Use ProjectedImage_to_hotspot_space(projected2X, projected2Y) to obtain (hotspot2X, hotspot2Y).
4. Obtain Hotspot point 3: Use ProjectedImage_to_hotspot_space(projected3X, projected3Y) to obtain (hotspot3X, hotspot3Y).
5. Obtain Hotspot point 4: Use ProjectedImage_to_hotspot_space(projected4X, projected4Y) to obtain (hotspot4X, hotspot4Y).
6. Construct Projected Image point 5 (projected5X, projected5Y) by standard analytic geometry following the line from Projected Image point 4 to 1 until it intersects the seam 85.
   a. Obtain Hotspot point 5: Use ProjectedImage_to_hotspot_space(projected5X, projected5Y) to obtain (hotspot5X, hotspot5Y), ensuring that hotspot5X=1.0.
7. Construct Hotspot point 6. (1.0, 1.0).
8. Construct Hotspot point 7. (0.0, 1.0).
9. Construct Projected Image point 8 (projected8X, projected8Y) by standard analytic geometry following the line from Projected Image point 1 to 4 until it intersects the seam.
   a. Obtain Hotspot point 8: Use ProjectedImage_to_hotspot_space(projected8X, projected8Y) to obtain (hotspot8X, hotspot8Y), ensuring that hotspot5X=0.0.
10. Store the projected image in the action handler as the sequence of hotspot points:
    a. Hotspot point 1: (hotspot1X, hotspot1Y)
    b. Hotspot point 2: (hotspot2X, hotspot2Y)
    c. Hotspot point 3: (hotspot3X, hotspot3Y)
    d. Hotspot point 4: (hotspot4X, hotspot4Y)
    e. Hotspot point 5: (1.0, hotspot4Y)
    f. Hotspot point 6: (1.0, 1.0)
    g. Hotspot point 7: (0.0, 1.0)
    h. Hotspot point 8: (0.0, hotspot1Y)

Figure 8C:
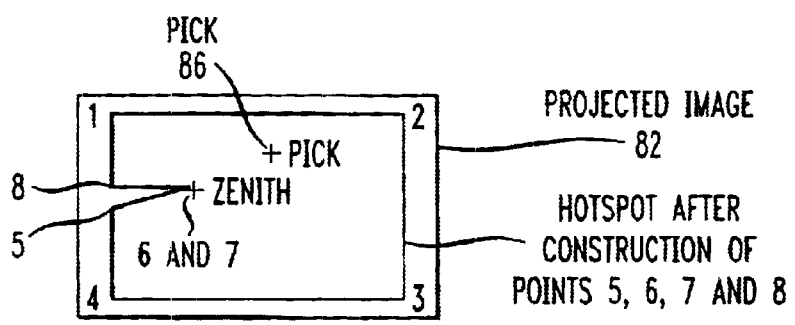

Note that constructed points 5–8, shown in FIG. 8C, are not displayed by the application program, which prefers a simple box with a final line from Projected Image point 4 to Projected Image point 1; Points 5–8 are delivered to the application program by the system, but the system leaves display up to the application to allow flexibility without need for the system to be modified for individual media types. Now any pick 86 within the displayed points 1–4 of the projected image will fall as pick 87 in the closed loop of points 1–8 in the hotspot space of FIG. 8B after processing by ProjectedImage_to_hotspot_space(projectedImageX, projetedImageY).

More or less than 4 points may be used as the starting point in the projected image. Also there is an obvious extension of this method of covering zenith (north pole of the sphere) to cover instead nadir (at the south pole of the sphere).

Figure 9A:
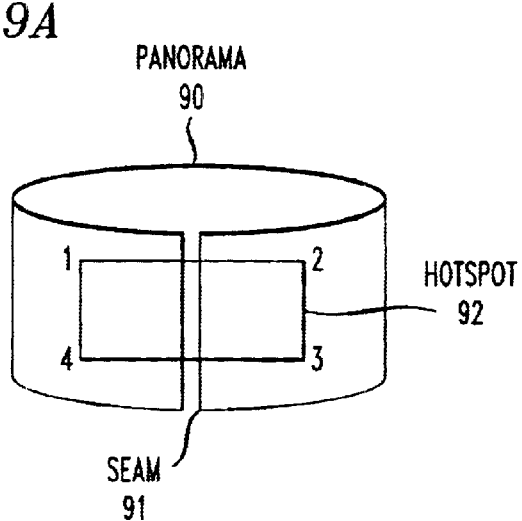
FIGS. 9A, B, and C are representations of a hotspot defined in a wrapped-around panorama.
Figure 9B:
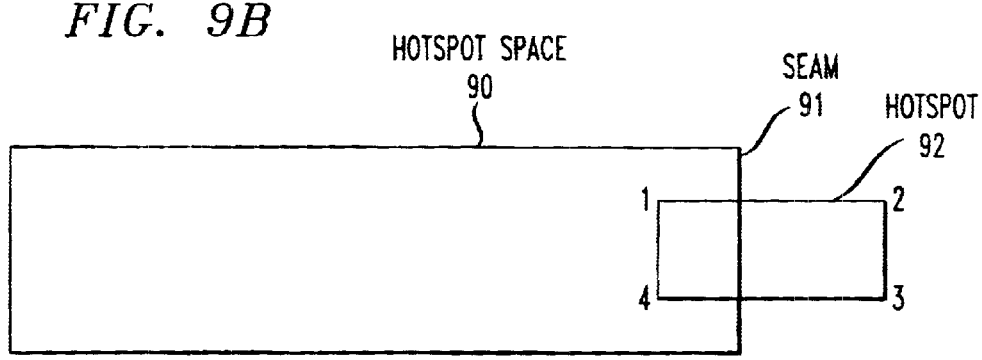
Figure 9C:
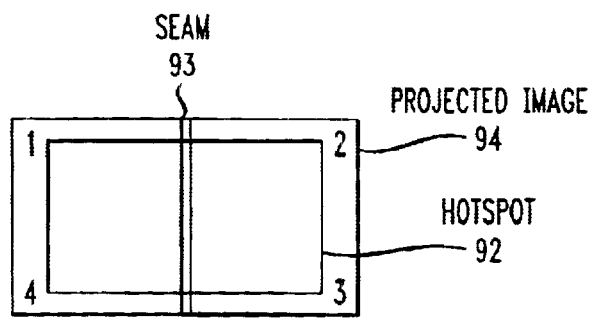

FIGS. 9A, B, C show a representation of a hotspot defined in a wrapped-around panorama non-linear media. Consider for example the panorama 90, shown in FIG. 9A. The left and right edges of the panorama touch at a seam 91 to make a continuous cylinder. A hotspot 92 crosses this boundary. One way to handle the hotspot is by breaking it into two hotspots A, B at the seam, one for each side of the panorama. However, breaking the hotspot into two parts produces picking and display challenges since picking is done in a uniform way for all media. Anther way to overcome this hotspot problem is construct the hotspot 92 to hang off the end of the panorama at the far edge, as shown in FIG. 9B. A method for storing such a hotspot is as follows:

1. Define a hotspot as above as a sequence of points in the projected image 94, as shown in FIG. 9C, and then map its defining points to the hotspot space, using ProjectedImage_to_hotspot_space( ).
2. Construct in the projected image 94 a line 93 representing the seam between the beginning and the end of the panorama where they join each other.
3. For each pair of connected points in the projected image 94 see if the line connecting them crosses the panorama join line. If any do, add 1.0 to the x coordinate of the hotspot representation of the points (2 and 3 in this example) that have a hotspot x coordinate value less than 0.5. This will give them values slightly over 1.0 and off the right-hand end of the hotspot-space panorama as shown.
4. Display the hotspot coordinates that are past 360-degrees (1.0 in hotspot space) wrapped around to less than 360 degrees when reprojecting back onto projected-image space.

Figure 10A:
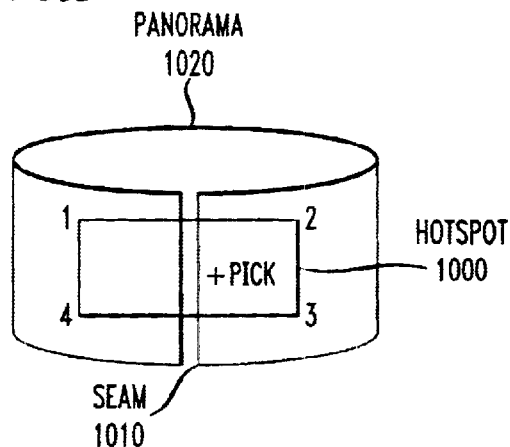
FIGS. 10A, B, and C are representations of picking a hotspot in a wrapped-around panorama.
Figure 10B:
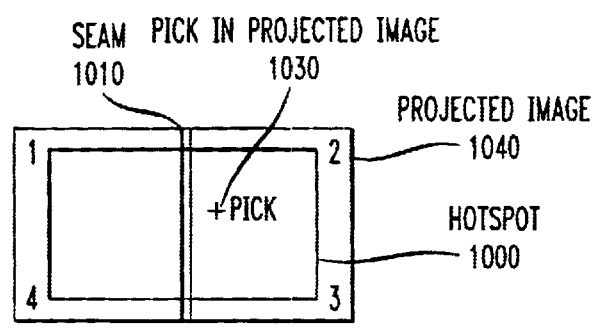
Figure 10C:
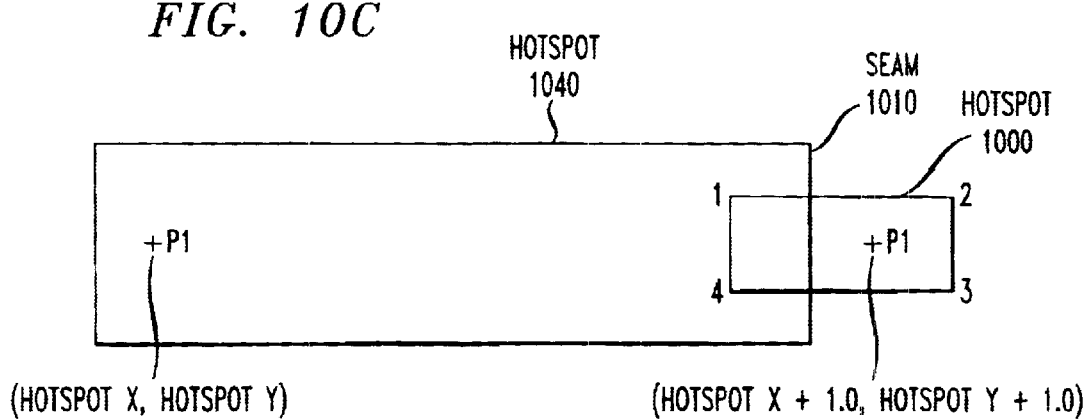

In FIGS. 10A, B, C, picking can take place in the extended range past the end of the media given that hotspots from FIG. 9B can hang off the end. FIG. 10A shows a hotspot 1000 straddling the seam 1010 where the two ends of the panorama 1020 join. Since a mouse or other picking device is in one location ranging from 0–360° (0–1 in the projected image 1040), as shown in FIG. 10B, it is necessary to check two places for hotspot information either for hotspot display or for picking. In FIG. 10C, the two places are P1 where the mouse is and P2 at mouse position plus 360°. A method for picking on a panorama is as follows:

1. Receive mouseX and mouseY coordinates 1030 in the Projected Image 1040 when the mouse is clicked.
2. Set projectedX to mouseX
3. Set projectedY to mouseY
4. Use ProjectedImage_to_hotspot_space(projectedX, projectedY) to obtain (hotspotX, hotspotY), which is the location of the pick P1 in hotspot space.
5. For each hotspot, compare the mouse pick position at (hotspotX, hotspotY) to see if it is inside the hotspot. Java has a method (a function) for this test, "inside( )" Typical use: polygon.inside(x, y), which tests point x,y to see if it is in polygon "polygon."
6. If no hotspot is found at P1, then for each hotspot, compare the mouse pick position P2 at (hotspotX+1.0, hotspotY) to see if it is inside the hotspot.

Because the preceding method requires checking both P1 and P2 against all hotspots to determine if they are in them, some efficiency can be obtained by preprocessing the hotspots to ensure that if P2 is in a hotspot, then P1 certainly is not and need not be checked. Likewise if P1 is in a hotspot, then P2 certainly is not and need not be checked.

Figure 11A:
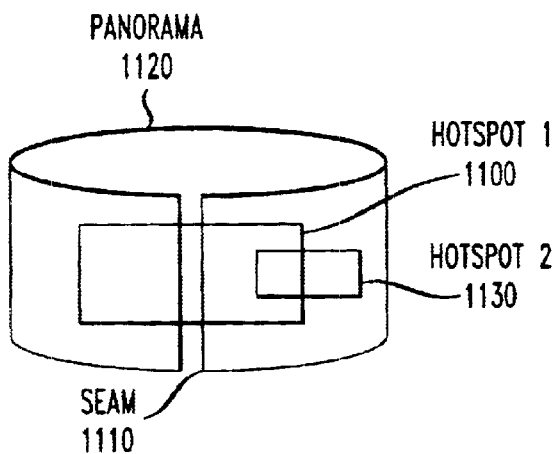
FIGS. 11A, B, and C are representations of a hotspot in a projected image that overlaps a wrapped around "hotspot" in a non linear media but does not itself wrap around.

FIGS. 11A, B, C illustrate a method to combine overlapped hotspots under some circumstances, moving some hotspots off the right-hand end of the panorama. FIG. 11A shows a hotspot 1100 straddling the seam 1110 where the two ends of the panorama 1120 join. The method is as follows:

For each hotspot, flag the hotspot 1100 if it overlaps the seam (hotspot 1 in this example).

Figure 11B:
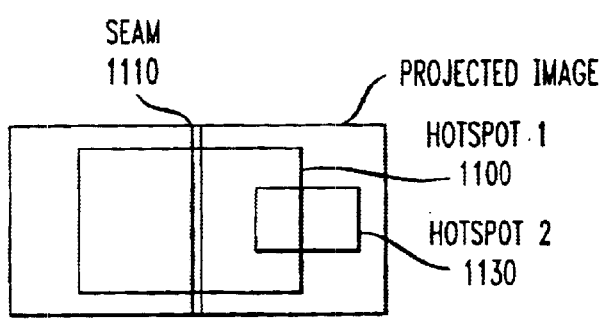
Figure 11C:
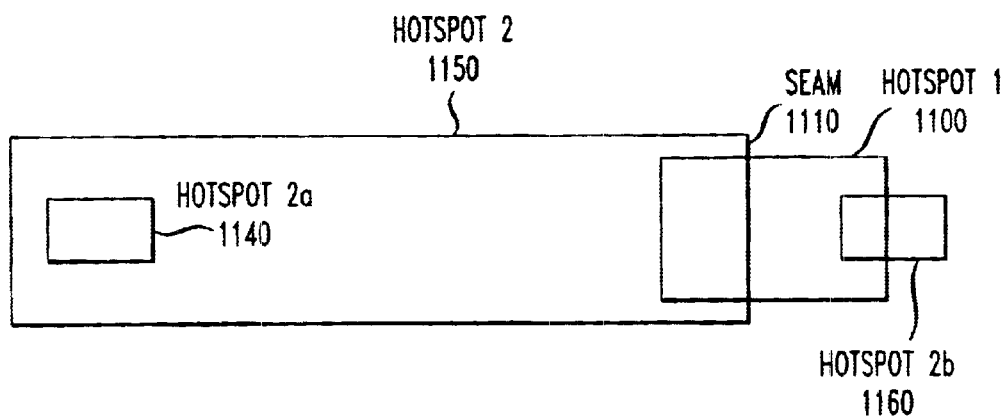

1. In FIG. 11B, for each of the other hotspots 1130, determine in
2. FIG. 11C if the hotspot 1140 in hotspot space 1150, 1130 would overlap a flagged hotspot if 1.0 were added to the x coordinates of all its points 1160.
   a. If so, then add 1.0 to the value of all x coordinates in this other hotspot.

While the invention has been shown and described in conjunction with a preferred embodiment, various changes is to be made without departing from the spirit and scope of the invention as defined in the appended claims.

We claim:

1. A system for unifying an action-initiating area subject to non-linear transformation and interpolation in heterogeneous media representations, comprising:
   a) means for storing linear and non-linear media;
   b) means for defining an action-initiating area in the media in terms of action-initiating area coordinates;
   c) means for transforming and mapping media action-initiating area coordinates into corresponding coordinates of an action-initiating area for display in a projected image; and
   d) means for unifying the action-initiating area in the media and the projected image regardless of media type.

2. The system of claim 1 further comprising:
   e) means for holding the projected image in the display.

3. The system of claim 2 further comprising:
   f) means for selecting an action-initiating area in the projected image and signaling the media of the selection.

4. The system of claim 3 further comprising:
   g) means responsive to the selection to determine if the selected image action-initiating area is within the coordinates of the corresponding media action-initiating area.

5. The system of claim 4 further comprising:
   h) means for initiating an event associated with the media action-initiating area if the selected image action-initiating area is within the coordinates of the corresponding media action-initiating area.

6. In a system including media containing action-initiating areas for linking to other media, a display for displaying a projected image in the media containing an action-initiating area, an input device for signaling a selection of an action-initiating area in the projected image and a processor for converting coordinates of the media action-initiating area into corresponding coordinates of the action-initiating area in the projected image, a method for unifying an action-initiating area subject to non-linear transformation and interpolation in heterogeneous media representations, comprising the steps of:
   a) defining the action-initiating area in the media in terms of action-initiating area coordinates;

b) storing linear and non-linear media and an action-initiating area within the media, c) transforming and mapping media action-initiating area coordinates into corresponding coordinates of an action-initiating area in a projected image of a display;

d) unifying the action-initiating area in the media and the projected image;

e) holding the projected image in the display; and f) selecting an action-initiating area in the projected image and signaling the media of the selection.

7. The method of claim 6 further comprising the step of:

g) responding to the selection to determine if the selected image action-initiating area is within the coordinates of the corresponding media action-initiating area.

8. The method of claim 7 further comprising the step of:

h) initiating an event associated with the media action-initiating area if the selected image action-initiating area is within the coordinates of the corresponding media action-initiating area.

9. In an information system including an action enabler and an action handler for transferring media programs to a projected image display, a method for storing and handling action-initiating areas in the media, comprising the steps of:

a) collecting values from an action-initiating area location in the media programs stored in the information system in a first coordinate system;

b) transforming the values to an action-initiating area coordinate system;

c) querying an action enabler for an action-initiating area at the location in the projected image display;

d) returning the action-initiating area at the query location; and e) displaying the action-initiating area in the media in the action-initiating area coordinate system.

10. The method of claim 9 wherein action-initiating area coordinate system characteristics are known to the media programs.

11. The method of claim 10 wherein the action-initiating areas are stored in an action handler, which communicates action-initiating area information between itself and the media programs.

12. The method of claim 10 wherein the action-initiating area coordinate system is a Euclidean, rectangular coordinate system.

13. The method of claim 9 further comprising the step of:

f) picking in the projected image display and converting to the action-initiating area coordinate system by the media programs before sending queries to the action handler; and g) reporting action-initiating area information back to the media programs in the action-initiating area coordinate system by the action handler.

14. The method of claim 13 wherein one or more events or semantic actions on encountering or picking the action-initiating area are decoupled from the media.

15. The method of claim 14 wherein the media programs request for the action handler to perform events on the prior communication with the action handler.

16. The method of claim 13 wherein picking in the projected image display is performed as a point-in-polygon test in the action-initiating area coordinate system.

17. The method of claim 13 wherein picks are made as point-in-polygon tests both at a current position of an input device and a position of the input device in wrapped space off the end of media space.

18. The method of claim 9 wherein the media supply callback functions to do the transformations which enables other programs to convert to and from the action-initiating area coordinate system.

19. The method of claim 9 wherein the action-initiating area coordinate system is not the same as media space, media space being the space in which the media are stored and from which media are transformed to the projected image, a action-initiating area being attached to the media space if the media space is the same as the action-initiating area coordinate system.

20. The method of claim 9 wherein the media draw and process a action-initiating area coordinate system that is not in media space.

21. The method of claim 9 wherein shapes in a projected image display are approximated by shapes in the action-initiating area coordinate system.

22. The method of claim 21 wherein rectangles or other polygons in the projected image are approximated by other polygons, possibly with more vertices in order to make a bilinear approximation of straight lines with the number of vertices allowed to be determined by the amount of non-linearity at that place in the media.

23. The method of claim 21 wherein shapes in the projected image display are approximated by other shapes in the action-initiating area coordinate system.

24. The method of claim 21 wherein the intersection of shapes in the projected image display is detected as shape intersections in the action-initiating area coordinate system.

25. The method of claim 21 wherein the action-initiating areas that cover singularities in media space are converted to complex shapes in the action-initiating area coordinate system so as to avoid a singularity in the action-initiating area coordinate system.

26. The method of claim 21 wherein the action-initiating area in a region of wraparound in media space is represented as a shape that extends past one end of the unwrapped media space.

27. The method of claim 26 wherein the action-initiating area that overlaps the wraparound in media space and each other are all pushed off the end of media space, including those that do not overlap the wraparound.

28. A method of generating and processing an action-initiating area subject to non-linear transformation associated with media representations, comprising the steps of:

a) obtaining non-linear media;

b) defining an action-initiating area in the non-linear media in terms of action-initiating area coordinates;

c) transforming and mapping media action-initiating area coordinates into corresponding coordinates of an action-initiating area for display in a projected image; and d) unifying the action-initiating area in the media and the projected image regardless of media type.

29. The method of claim 28, wherein the action-initiating area comprises a hotspot.

* * * * *